United States Patent [19]
Takeuchi et al.

[11] Patent Number: 5,994,868
[45] Date of Patent: Nov. 30, 1999

[54] MOTOR CONTROL DEVICE

[75] Inventors: Hiroaki Takeuchi, Tenri; Tohru Okuda, Nara, both of Japan

[73] Assignee: Sharp Kabushiki Kaisha, Osaka, Japan

[21] Appl. No.: 08/792,109

[22] Filed: Jan. 31, 1997

[30] Foreign Application Priority Data

Jan. 31, 1996 [JP] Japan ................... 8-015074

[51] Int. Cl.⁶ .................................. G05B 5/01
[52] U.S. Cl. .......................... 318/616; 318/611
[58] Field of Search ................. 318/561, 432, 318/646, 615, 608, 609, 610, 600, 601, 603, 616–618; 364/431.02, 161, 165, 163

[56] References Cited

U.S. PATENT DOCUMENTS

| | | |
|---|---|---|
| 4,912,381 | 3/1990 | Culberson ................. 318/561 |
| 4,990,001 | 2/1991 | Losic et al. ................. 388/811 |
| 5,036,266 | 7/1991 | Burke ....................... 318/646 |
| 5,079,493 | 1/1992 | Futami et al. ................ 318/640 |
| 5,115,418 | 5/1992 | Shimada .................... 318/616 |
| 5,189,620 | 2/1993 | Parsons et al. ............ 364/431.02 |
| 5,623,189 | 4/1997 | Hemmer .................... 318/432 |

FOREIGN PATENT DOCUMENTS

| | | |
|---|---|---|
| 03155383 | 7/1991 | Japan . |
| 05122970 | 5/1993 | Japan . |
| 05300782 | 11/1993 | Japan . |

OTHER PUBLICATIONS

"Precision DTF (Dynamic Track Following) Control System—High–Accuracy Tracking Control System with the use of Movable Head", by H. Takeuchi et al., Paper for Lecture at Spring Meeting of Institute of Precision Engineering, pp. 1071–1072.

"Precision DTF Control System—High–Accuracy Tracking Control System and Method of Head Movement Suspension During Non–Scanning Period" by H. Takeuchi et al., Paper for Regular Lecture in Kansai Area of Institute of Precision Engineering 1996, pp. 37–38.

Precision DTF Control System Using Observer and Modified Observer by Hiroaki Takeuchi et al., 39th Lecture of Federation of Automatic Control (Oct. 17, 1996), pp. 91–92.

Primary Examiner—Brian Sircus

[57] ABSTRACT

A driving circuit for generating a motor driving voltage has a positive feedback loop for feeding back the motor driving voltage through a filter. The filter is arranged so as to have a transfer function given as $G_F(s)$ which (1) satisfies $G_F(s) \approx 1$ in a frequency band in which disturbances should be suppressed while (2) satisfies $|G_F(s)| < |G_{open}|$ in a full range of frequencies, where $G_{open}$ represents an open loop transfer function of a motor control device in which a positive feedback loop is not provided. With this arrangement, it is possible to suppress disturbances, irrelevant to motor characteristics which may vary. Besides, it is possible to provide a motor control device in which computations for disturbance compensation are considerably decreased.

34 Claims, 8 Drawing Sheets

MOTOR CONTROL DEVICE

FIELD OF THE INVENTION

The present invention relates to a motor control device. It relates particularly to a motor control device which, without detecting or estimating a torque applied to a motor as an external disturbance (hereinafter referred to as disturbance torque), can suppress an influence of the disturbance torque on the motor's rotating speed.

BACKGROUND OF THE INVENTION

Motors are now used for various purposes. For example, in an information recording/reproducing apparatus such as a VTR, or a magneto-optical disk drive, a motor is used for driving a magnetic head or an information recording medium.

In an information recording/reproducing apparatus of this type, a change in a relative speed of the magnetic head with respect to the information recording medium likely causes deterioration of an image quality or a sound quality, and causes noises. Therefore, it is necessary that the motor used therein should be controlled so that changes in the rotating speed of the motor are restrained. To achieve this purpose, a motor control device described below has been proposed.

FIG. 6 is a block diagram of a usual motor control device. As illustrated in this figure, a characteristic of a motor 31 is represented as a transfer function of $1/(Js+C)$, where J represents a moment of inertia of the motor 31, C represents a coefficient of viscosity which is determined with an influence of a back electromotive force on the motor 31 taken into consideration, and s represents the Laplace operator.

An output $\omega$ of this motor control device is a velocity signal indicating a rotating speed of the motor 31, which is detected by a velocity detector (not shown). Note that here it is premised that a velocity signal indicating an accurate rotating speed of the motor 31 can be obtained by the velocity detector.

A comparator 32 is provided on an input side of the motor control device. The comparator 32 outputs an error signal $E_{rr}$ as a difference between a velocity reference value $\omega_{ref}$ as a reference speed of the motor 31 and the velocity signal $\omega$.

A driving circuit 33 is connected to an output terminal of the comparator 32 so that the error signal $E_{rr}$ is supplied to the driving circuit 33. The driving circuit 33 conducts a control operation which is a combination of proportional compensation and integral compensation, and outputs a driving voltage $V_r$. Note that the proportional compensation relates to speed control whereas the integral compensation relates to phase control. A characteristic of the driving circuit 33 is represented as a transfer function of $K_p + K_i/s$, where $K_p$ represents a proportional gain whereas $K_i$ represents an integral gain.

A block 34 is connected to an output terminal of the driving circuit 33. The block 34 converts the driving voltage $V_r$ into a driving torque $T_m$. A characteristic of the block 34 is represented as a coefficient $K_t$, and the coefficient $K_t$ is called the torque constant. Note that the torque constant is a constant found by calculating (driving torque)/(driving voltage).

A disturbance torque $T_g$ is applied to the motor 31, and a subtracter 35 is equivalently connected to an output terminal of the block 34 so that the driving torque $T_m$ and the disturbance torque $T_g$ applied to the motor 31 are supplied to the subtracter 35. Note that the subtracter 35 is shown in the figure for convenience sake so as to indicate that the disturbance torque $T_g$ is applied to the motor 31, and such a circuit as the subtracter 35 does not actually exist in this arrangement. The subtracter 35 subtracts the disturbance torque $T_g$ from the driving torque $T_m$, and sends a net driving torque T thus obtained to the motor 31. The motor 31 rotates in accordance with the net driving torque T, and sequentially the velocity signal $\omega$ is detected.

The velocity signal $\omega$ is sent to the comparator 32 through a negative feedback loop. Thus, the control operation is carried out so that the velocity signal $\omega$ coincides with the velocity reference value $\omega_{ref}$. Note that the negative feedback loop which feeds back the velocity signal $\omega$ is hereinafter referred to as loop A. An open loop transfer function $G_{open}$ of this control system is given as:

$$G_{open} = (K_p + K_i/s) \cdot K_t \cdot \{1/(J \cdot s + C)\} \qquad (1)$$

FIG. 3 is at graph illustrating an example of a gain characteristic of the open loop transfer function $G_{open}$, which is indicated by a solid line in the graph. A frequency $f_c$ indicated on a horizontal axis of the graph is a gain crossover frequency. A response $G_{comp}$ of the motor 31's rotating speed to the disturbance torque $T_g$ in this control system is given as:

$$G_{comp} = \{1/(J \cdot s + C)\}/(1 + G_{open}) \qquad (2)$$

The response $G_{comp}$ has a chevron characteristic, as indicated by a broken line in the graph of FIG. 2. This characteristic is understandable, considering that the following relational expressions can be obtained using the above equation (2):

(i) when $|G_{open}| \gg 1$, \qquad (3)

$$\begin{aligned} G_{comp} &\approx \{1/(J \cdot s + C)\} / G_{open} \\ &= \{1/(J \cdot s + C)\} / [(K_p + K_i/s) \cdot K_t \cdot \{1/(J \cdot s + C)\}] \\ &= 1/\{(K_p + K_i/s) \cdot K_t\} \end{aligned}$$

(ii) when $|G_{open}| \ll 1$, \qquad (4)

$$G_{comp} \approx 1/(J \cdot s + C)$$

In other words, a disturbance suppressing characteristic on a side of a low band stems from an effect of the feedback control which is expressed by the above equation (3), while a disturbance suppressing characteristic on a side of a high band stems from an effect of the moment of inertia of the motor 31 which is expressed by the above equation (4).

However, further advanced motor control devices are recently demanded, and the above-described disturbance suppressing characteristic obtained by the feedback control is insufficient. For example, in VTR apparatuses, jitters of low frequencies cause edge noises due to signal cross talks on magnetic tapes, or cause track curving in the case of recording with respect to narrow tracks, or the like. Therefore, in the case where a rotating speed of a capstan motor is to be controlled, to enhance efficiency in suppressing disturbances in the low and middle bands is a matter of great importance.

As a method for obtaining a sufficient efficiency in suppressing disturbances particularly in the low and middle bands, a control method using a disturbance observer is well known (for example, see the Japanese Publication for Unexamined Patent Application No. 3-155383/1991 (Tokukaihei 3-155383)). According to this method, the disturbance suppressing efficiency is enhanced by estimating the disturbance torque applied to the motor and adding the disturbance torque thus estimated to the driving voltage of the motor in accordance with a feedforward control method.

FIG. 7 is Et block diagram illustrating a motor control device using a minimum-dimensional observer disclosed in the Japanese Publication for Unexamined Patent Application 3-155383/1991. In FIG. 7, the members having the same structure (function) as those in FIG. 6 will be designated by the same reference numerals and their description will be omitted. Note that in a transfer function of the motor 31, a term of viscosity is omitted.

The motor control device of FIG. 7 differs from that of FIG. 6 in that a disturbance estimating unit 40, a disturbance compensation gain 50 (coefficient: $1/K_m$), and an adder 36 are added. In FIG. 7, $J_n$ represents a nominal value of the moment of inertia of the motor 31, $K_m$ represents a nominal value of the torque constant $K_t$, and g represents a positive constant indicating a band for the disturbance observer 40.

The disturbance estimating unit 40, supplied with a motor driving voltage V and a velocity signal ω, outputs a signal $\hat{T}_{g1}$. To be more specific, the motor driving voltage V is supplied to a block 41 so as to be multiplied by a coefficient $g \cdot K_m$. The velocity signal ω is supplied to a block 42 so as to be multiplied by the coefficient $g^2 \cdot J_n$, while it is supplied to a block 43 so as to be multiplied by a coefficient $g \cdot J_n$. Then, outputs of the blocks 41 and 42 are added by an adder 44, and the added result is supplied to a first-order lag element represented as a block 45. Sequentially, an output of the block 43 is subtracted from an output of the block 45 by a subtracter 46, thereby resulting in that the signal $\hat{T}_{g1}$ is outputted.

The signal $\hat{T}_{g1}$ thus outputted from the disturbance estimating unit 40 is supplied to the disturbance compensation gain 50, so as to be multiplied by the coefficient $1/K_m$. As a result, a disturbance compensation signal VF is outputted from the disturbance compensation gain 50. The disturbance compensation signal VF is added by the adder 36 to a driving voltage $V_r$ which is outputted by the driving circuit 33, the added result being a motor driving voltage V. The motor driving voltage V is supplied to a block 34, and then, it is converted to a net driving torque which is supplied to the motor 31, as described above.

The disturbance compensation signal VF is given as:

$$VF = (1/K_m) \cdot [\{(g \cdot K_m) \cdot V + (g^2 \cdot J_n) \cdot \omega\}/(s+g) - (g \cdot J_n) \cdot \omega] \quad (5)$$

$$= (1/K_m) \cdot \{g/(s+g)\} \cdot \{K_m \cdot V - (J_n \cdot s) \cdot \omega\}$$

According to the equation (5), FIG. 7 can be equivalently re-drawn into FIG. 8. A transfer function indicating a characteristic of the block 47 in FIG. 8 is obtained by modeling a reverse characteristic of the motor 31, and the transfer function is hereinafter referred to as motor reverse model.

An output $\hat{T}_g$ of the subtracter 48 in FIG. 8 can be given as:

$$\hat{T}_g = K_m \cdot V - (J_n \cdot s) \cdot \omega \quad (6)$$

$$= K_m \cdot V - [(J_n \cdot s) \cdot \{(K_t \cdot V - T_g)/(J \cdot s)\}]$$

Given that $K_m = K_t$ and $J_n = J$, the equation (6) is reorganized as follows:

$$\hat{T}_g = T_g \quad (7)$$

As a result, an estimated value of the disturbance torque $T_g$ can be expressed using the output $\hat{T}_g$. Therefore, the output $\hat{T}_g$ is hereinafter referred to as disturbance estimation signal.

In FIG. 8, a block 49 whose transfer function is given as $g/(s+g)$ is a first-order low-pass filter having a cut-off frequency of $g/(2\pi)$[Hz]. Therefore, an output $\hat{T}_g$ of the block 49 is a low band component of the disturbance estimation signal $\hat{T}_g$.

In short, it is found that the control system (see FIG. 7) using the minimum-dimensional observer essentially:

(1) estimates the disturbance torque $T_g$;

(2) adds the low band component of the disturbance torque thus estimated to the driving voltage V in accordance with the feedforward control method; and (3) by doing so, cancels the low band component of the disturbance torque $T_g$.

However, with the above arrangement, a lot of calculations are necessary to obtain the disturbance compensation signal VF. To realize this system in hardware, elements in the motor control device are caused to increase, thereby making it difficult to miniaturize the device, while adding to costs. To realize this system in software, since a long period of time is required for carrying out a lot of calculations, arises a problem that performance of the device deteriorates due to the insufficient period for calculations and delay in response.

To avoid the delay in response, expensive microcomputers capable of high-speed processing are needed, and this also leads to a problem of adding to the costs of the device.

Furthermore, since nominal values of the motor characteristics are used in the foregoing arrangement when calculations are carried out, desired control performance of the motor control device cannot be achieved in the case where real values and nominal values are different due to, for example, irregularity in the motor characteristics.

SUMMARY OF THE INVENTION

The object of the present invention is to provide a motor control device, (1) which is capable of obtaining a disturbance suppressing effect substantially on a level with that of the above-described motor control device using the disturbance observer even with irregularity in the motor characteristic, and (2) with which computations for disturbance compensation can be considerably decreased.

To achieve the above object, the motor control device of the present invention comprises (1) a motor, (2) detecting unit for detecting a rotating speed of the motor, (3) error detecting unit, to which the rotating speed is supplied from the detecting unit by a negative feedback loop, for outputting an error signal indicating a difference between the rotating speed and a reference rotating speed, and (4) driving unit for generating and outputting a motor driving voltage in accordance with the error signal, the driving unit including a positive feedback loop for feeding back the motor driving voltage through a filter, wherein (1) the filter has a transfer function given as $G_F(s)$ which is set so as to become approximately 1 in a frequency band in which disturbances should be suppressed, and (2) the output of the detecting unit is practically and equivalently supplied directly to the error detecting unit by the negative feedback loop.

By analyzing the transfer function of the motor control device using the disturbance observer, the applicants of the present application have found that it is possible to omit an arrangement indispensable for generating a disturbance compensation signal in the case where (1) the positive feedback loop having the filter is added to the driving unit and (2) the characteristic of the filter is set as described above. In other words, with the arrangement described above, a disturbance suppressing effect on a level with that of the motor control device using the disturbance observer can be obtained in the frequency band in which disturbances should be suppressed, even without using the disturbance observer.

The disturbance observer requires either a hardware having large-scale circuitry which carries out computations for generating the disturbance compensation signal, or a software with which time-consuming computations are carried out. Therefore, by omitting the disturbance observer from the arrangement of the motor control device, the motor control device can be miniaturized, or at least, costs can be reduced. Furthermore, since there is no need to carry out computations for generating the disturbance compensation signal, deterioration of control performance due to delay in response by no means occurs.

Moreover, since the disturbance observer is not used, an inconvenience that irregular motor characteristics influence on the generation of the disturbance compensation signal is avoided, thereby ensuring that a stable disturbance suppressing effect is obtained.

For a fuller understanding of the nature and advantages of the invention, reference should be made to the ensuing detailed description taken in conjunction with the accompanying drawings.

DESCRIPTION OF THE PREFERRED EMBODIMENTS

Before describing an embodiment of the present invention, the disturbance observer which is described above as the prior art will be discussed. Since the present invention was thought of based on the following discussion, it is important to review the discussion here.

Figure 4:
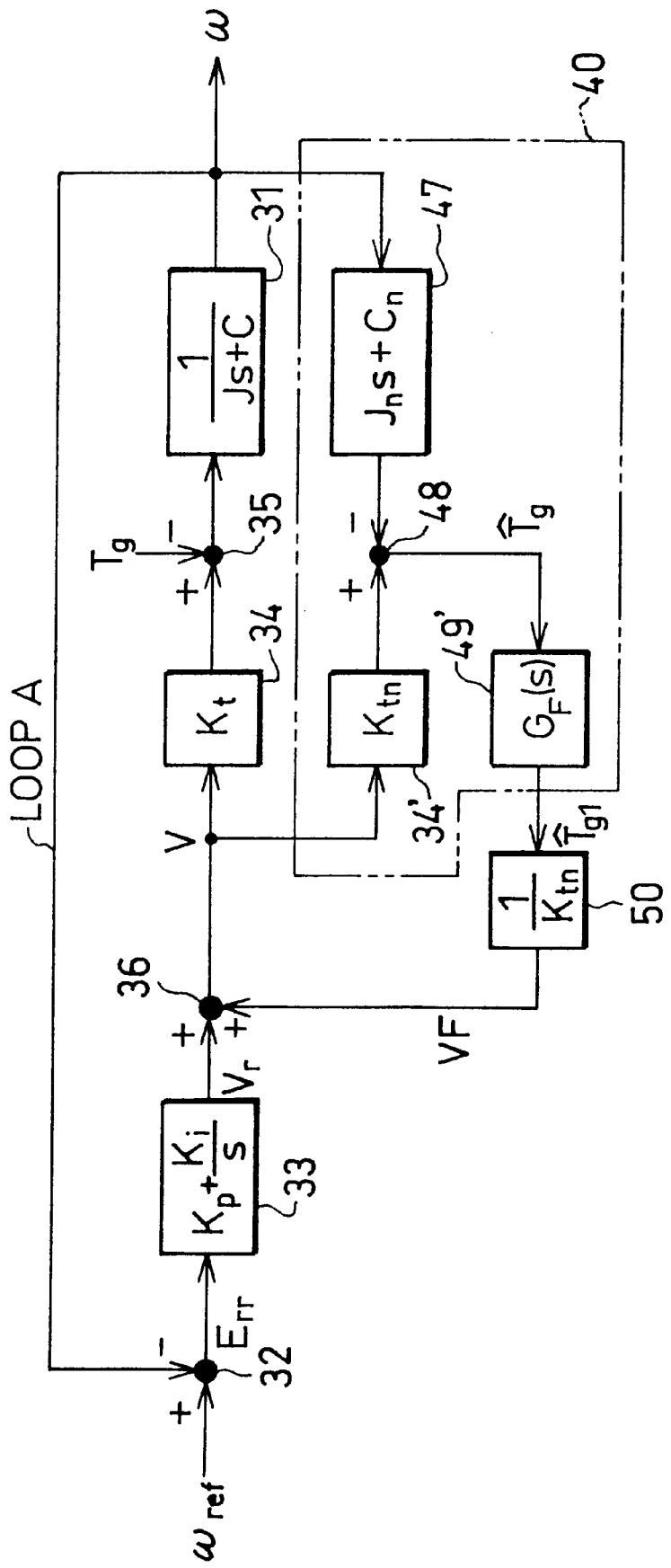
FIG. 4 is a block diagram obtained by generalizing a motor control device shown in FIG. 7 in light of the present invention.
Figure 7:
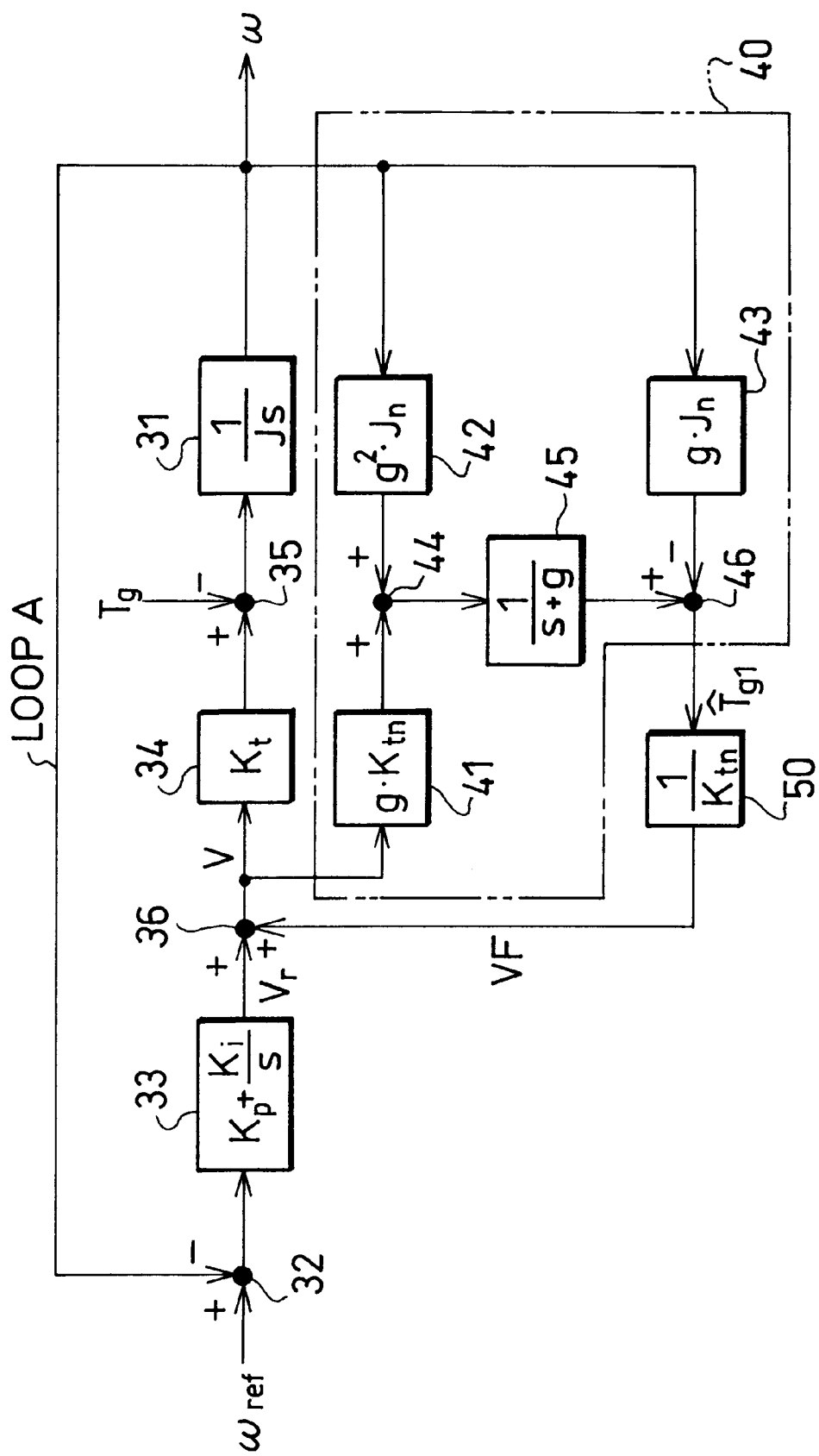
FIG. 7 is a block diagram illustrating an arrangement of a conventional motor control device having a disturbance observer.
Figure 8:
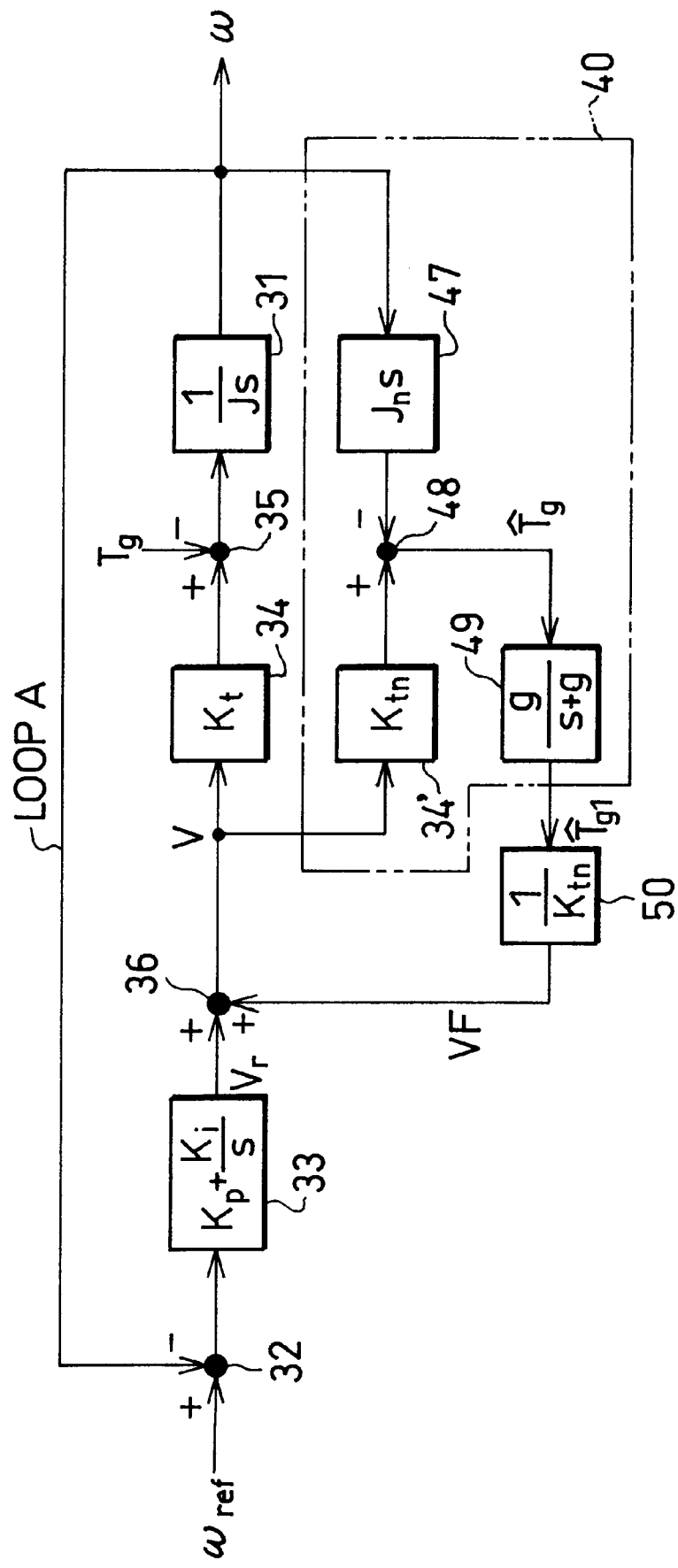
FIG. 8 is a block diagram illustrating another arrangement of the conventional motor control device having the disturbance observer.

FIG. 4 is a block diagram which is obtained by more generally redrawing FIGS. 7 and 8 in view of the preferred embodiments to illustrate the control system using the disturbance observer. Specifically, the block 49 (low-pass filter) of FIG. 8 is replaced with a filter 49' whose transfer function is given as $G_F(s)$ in FIG. 4. Besides, the transfer functions of the motor 31 and the block 47 (motor reverse model) contain the coefficient C of viscosity and the nominal value $C_n$ of the coefficient of viscosity, respectively. Thus, the respective characteristics of the motor 31 and the block 47 are more practically expressed. Note that an influence of a back electromotive force is included in the coefficient C of viscosity.

According to the block diagram of FIG. 4, the disturbance compensation signal VF can be expressed as follows:

$$VF = (G_F(s)/K_{tn}) \cdot [K_{tn} \cdot V - \{(J_n \cdot s + C_n) \cdot \omega\}] \quad (8)$$
$$= G_F(s) \cdot V - (G_F(s)/K_{tn}) \cdot (J_n \cdot s + C_n) \cdot \omega$$

The driving voltage V is obtained by adding the driving voltage $V_r$ outputted by the driving circuit 33 and the disturbance compensation signal VF by the use of the adder 36. Here, the driving voltage $V_r$ can be expressed as follows:

$$V_r = (K_p + K_i/s) \cdot (\omega_{ref} - \omega) \quad (9)$$

Therefore, using the equations (8) and (9), the driving voltage V can be expressed as follows:

$$V = V_r + VF \quad (10)$$
$$= (K_p + K_i/s) \cdot (\omega_{ref} - \omega) + \{G_F(s) \cdot V - (G_F(s)/K_{tn}) \cdot (J_n \cdot s + C_n) \cdot \omega\}$$
$$= G_F(s) \cdot V + (K_p + K_i/s) \cdot [(\omega_{ref} - \omega) - \{1/(K_p + K_i/s)\} \cdot (G_F(s)/K_{tn}) \cdot (J_n \cdot s + C_n) \cdot \omega]$$

Figure 5:
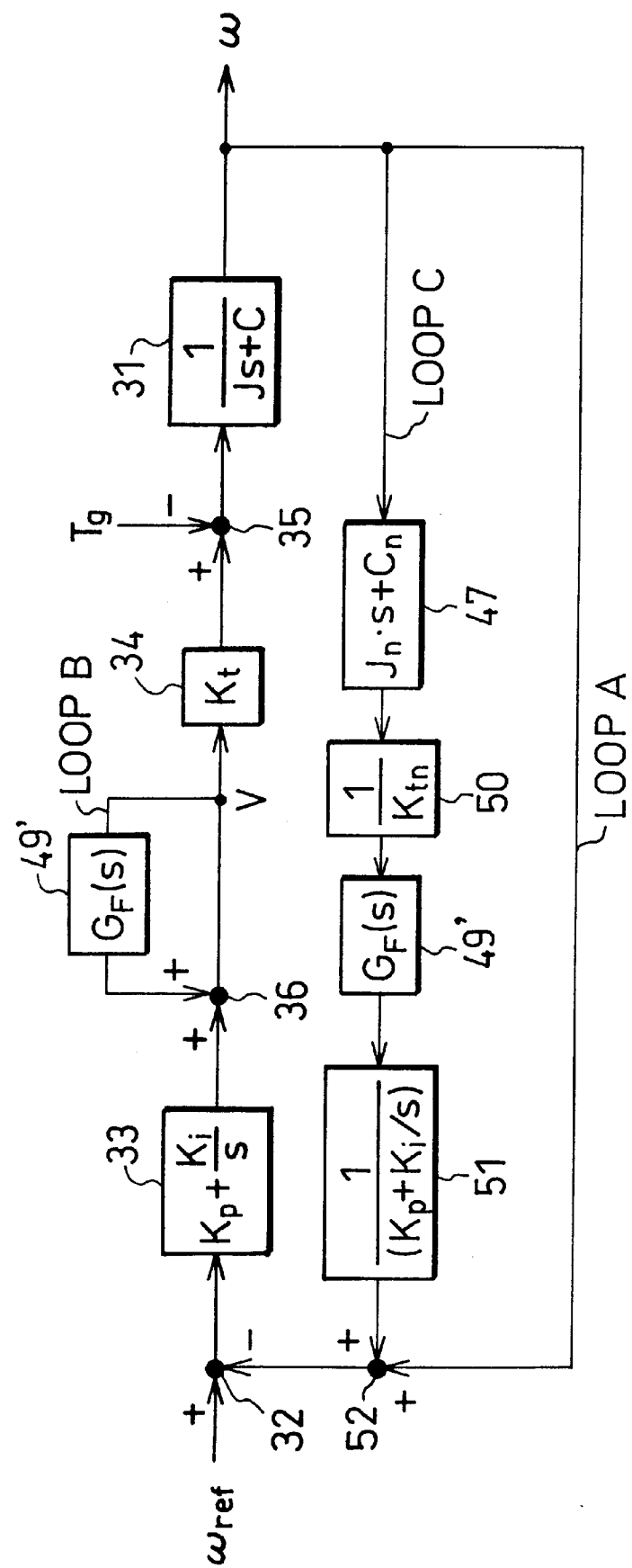
FIG. 5 is a block diagram equivalently illustrating the arrangement of the motor control device shown in FIG. 4, in light of the present invention.
Figure 6:
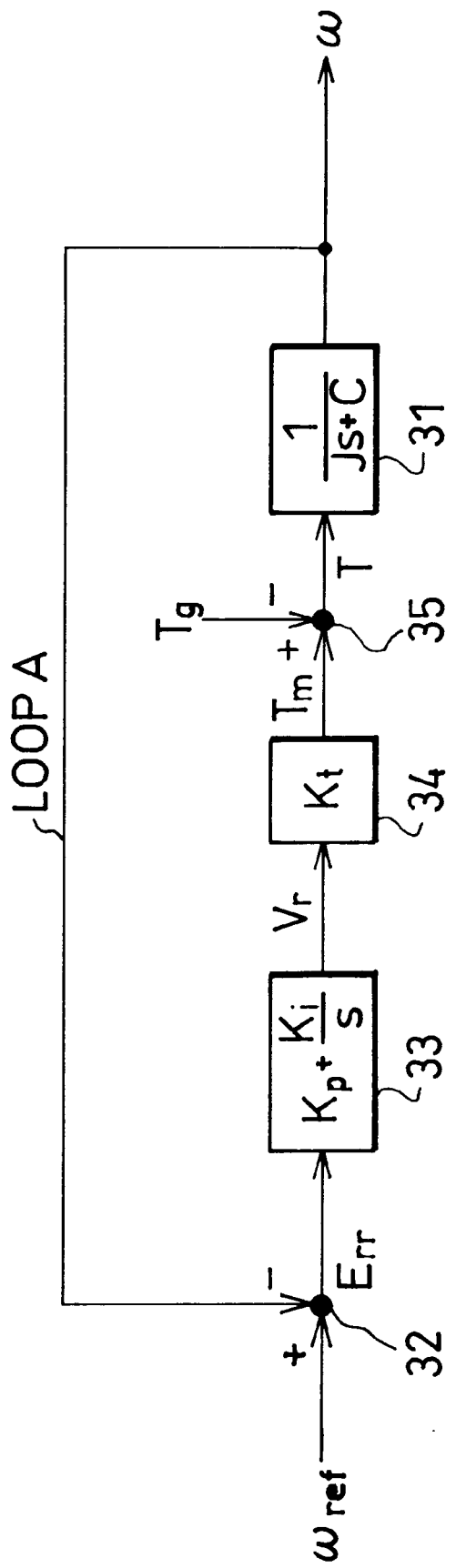
FIG. 6 is a block diagram illustrating an arrangement of a motor control device which carries out conventional feedback control.

Using the equation (10), the control system of FIG. 4 can be equivalently re-drawn into a block diagram of FIG. 5. It can be seen that the structure shown in FIG. 5 is realized by adding a loop B and a loop C to the conventional feedback control system shown in FIG. 6. The loop B is a positive feedback loop having the filter 49', through which the driving voltage V is fed back to the adder 36. The loop C is a negative feedback loop having the block 47, the disturbance compensation gain 50, the filter 49', the block 51, and an adder 52 through which the velocity signal ω is fed back to the comparator 32. Since the velocity signal ω is directly fed back to the adder 52 through the loop A as well, the velocity signal ω to which an output of the block 51 is added is supplied to the comparator 32. The comparator 32 outputs a difference between the velocity reference value $\omega_{ref}$ and an output of the adder 52. Note that the a transfer function of the block 51 is given as $1/(K_p + K_i/s)$ In accordance with the block diagram of FIG. 5, the open loop transfer function $G_{open1}$ of the control system shown in FIG. 5 is expressed as follows:

$$G_{open1} = [(K_p + K_i/s) \cdot \{1/(1-G_F(s))\} \cdot K_t \cdot \{1/(J \cdot s + C)\}] \cdot [1 + \{1/(K_p + K_i/s)\} \cdot (G_F(s)/K_{tn}) \cdot (J_n \cdot s + C_n)] \quad (11)$$

Using the equation (1), the equation (11) can be reorganized as follows:

$$G_{open1} = \{1/(1-G_F(s))\} \cdot [G_{open} + G_F(s)) \cdot (K_t/K_{tn}) \cdot \{(J_n \cdot s + C_n)/(J \cdot s + C)\}] \quad (12)$$

Note that as described above, $G_{open}$ is the open loop transfer characteristic of the feedback control system which does not have the disturbance observer.

Given that in the equation (12) $K_{tn}$, $J_n$, and $C_n$ are desirably set so that $K_{tn}$, $J_n$, and $C_n$ satisfy $K_{tn} = K_t$, $J_n = J$, and $C_n = C$, respectively, the following equation is obtained:

$$G_{open1} = \{1/(1-G_F(s))\} \cdot \{G_{open} + G_F(s)\} \quad (13)$$

Using the equation (13), a response $G_{comp1}$ of the velocity signal ω to the disturbance torque $T_g$ in the control system of FIG. 4 can be given as:

$$G_{comp1} = \{1/(J \cdot s + C)\}/(1 + G_{open1}) \quad (14)$$
$$= \{1/(J \cdot s + C)\}/[1 + \{1/(1 - G_F(s))\} \cdot \{G_{open} + G_F(s)\}]$$
$$= (1 - G_F(s)) \cdot [\{1/(J \cdot s + C)\}/(1 + G_{open})]$$

Using the equation (2), the equation (14) can be reorganized as:

$$G_{comp1} = (1 - G_F(s)) \cdot G_{comp} \quad (15)$$

Therefore, the influence of the disturbance torque $T_g$ in this case is suppressed so as to be $(1-G_F(s))$ fold of that of the feedback control system. In other words, it is possible to suppress the influence of the disturbances in a specific frequency band in which the disturbances should be suppressed, by setting $G_F(S)$ in the frequency band so that:

$$G_F(s) \approx 1 \quad (16)$$

Thus, the disturbance observer is very effectual in suppressing the influence of the disturbance torque on the rotating speed of the motor. However, the applicant of the present invention has discovered that depending on setting up of the transfer function of the filter 49', a sufficient disturbance suppressing effect can be obtained with substantially no operation of the loop C. The following description will discuss the reason.

First of all, using the equation (13), the following relational expressions can be obtained:

(i) when $|G_{open}| \gg |G_F(s)|$, $G_{open1} \approx G_{open}/\{1-G_F(s)\}$ (17)

(ii) when $|G_{open}| \ll |G_F(s)|$, $G_{open1} \approx G_F(s)/\{1-G_F(s)\}$ (18)

Regarding the above equation (17), since $G_{open}$ represents the open loop transfer characteristic of the feedback control system not having the disturbance observer, the loop C of FIG. 5 conducts substantially no operation in the case where the condition (i) is satisfied for a full range of frequencies.

Figure 2:
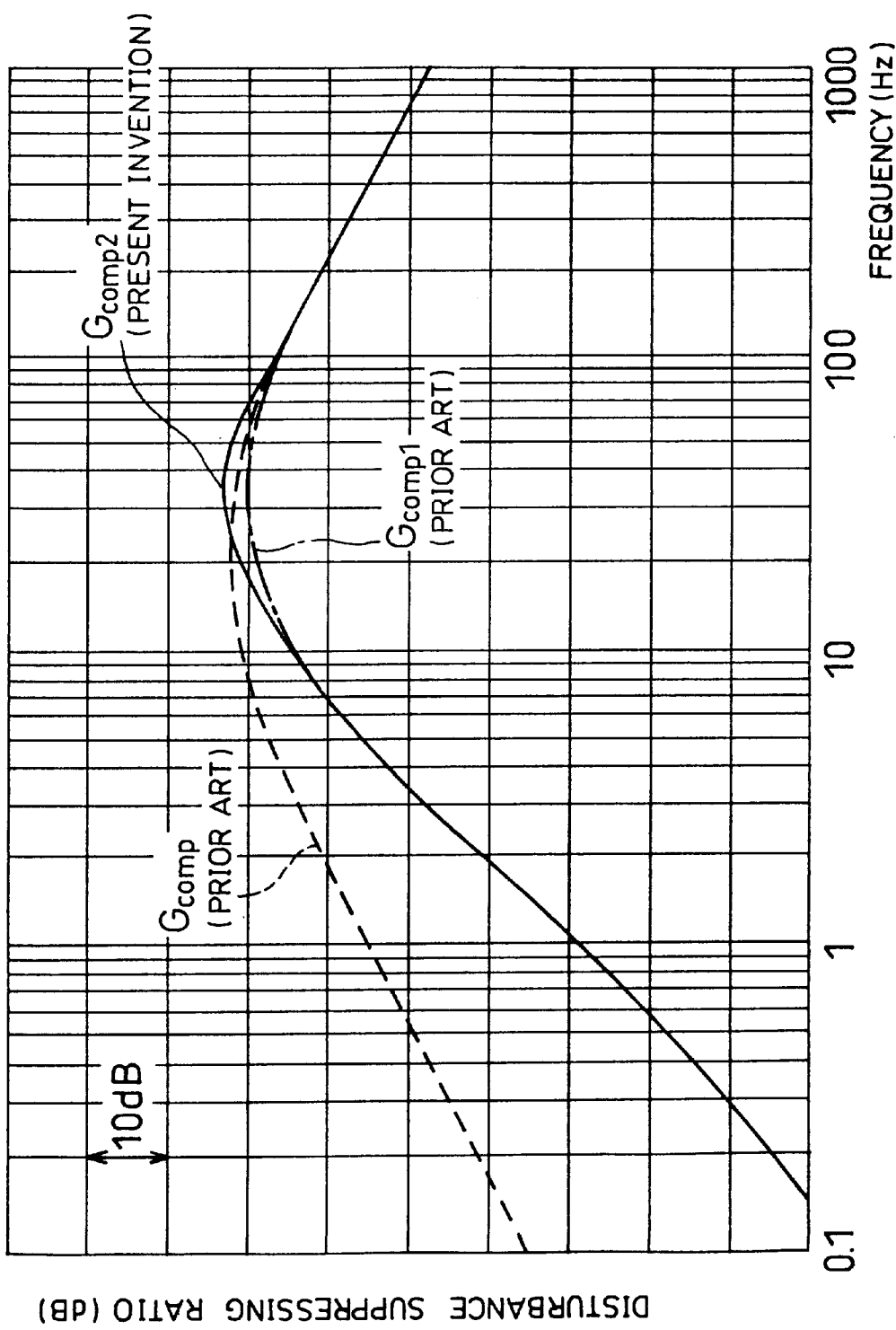
FIG. 2 is a graph illustrating a disturbance suppressing effect of the motor control device of the present invention, in comparison with those of conventional motor control devices.
Figure 3:
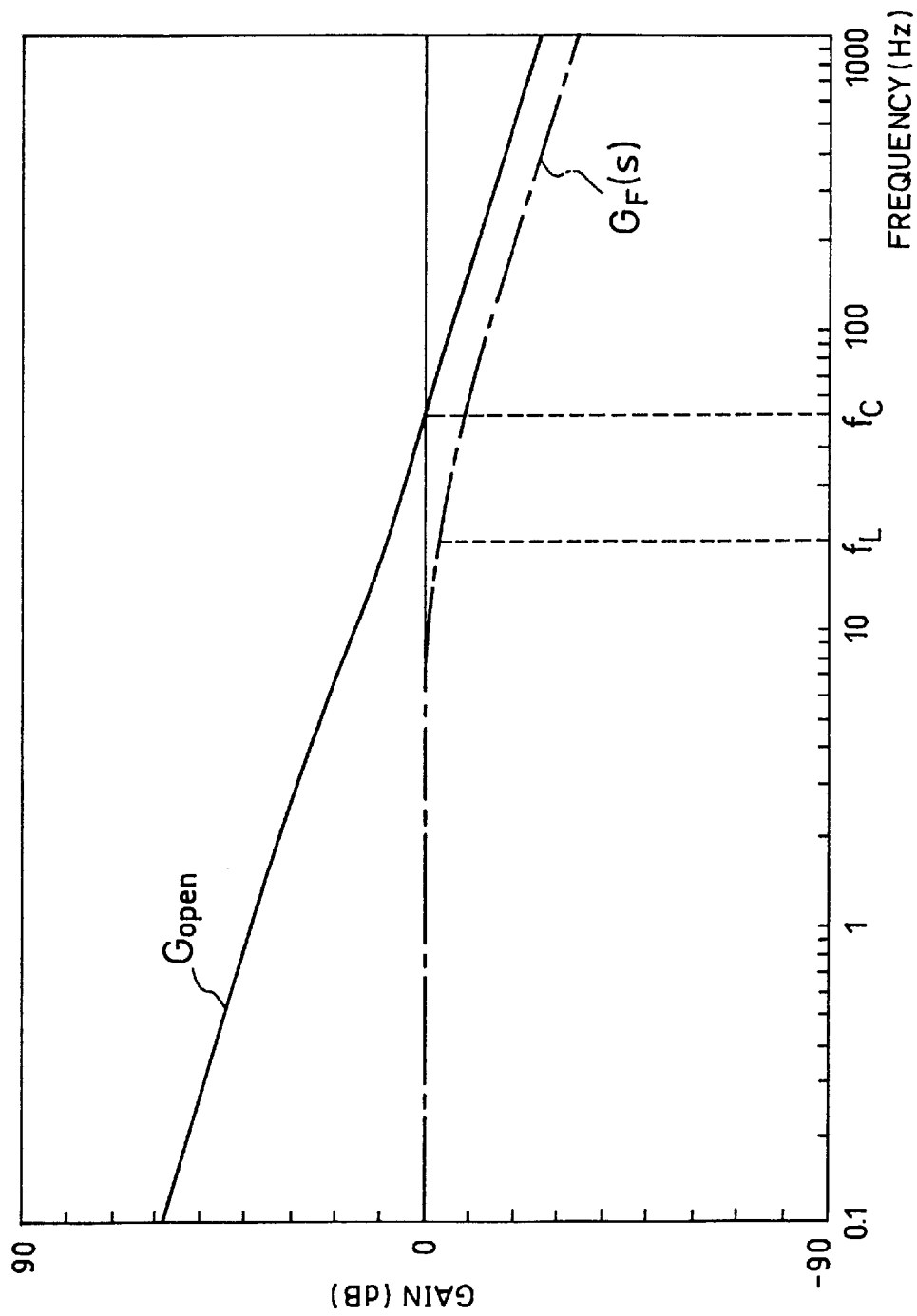
FIG. 3 is a graph illustrating a characteristic of a filter used in the arrangement shown in FIG. 1, in comparison with a conventional open loop transfer characteristic.

For example, a first-order low-pass filter having a characteristic which is indicated by a chain line in FIG. 3 can be utilized as the filter 49' ($G_F(s)$) satisfying the condition (i). In this case, a cut-off frequency $f_L$ of the filter 49' is set not higher than a gain crossover frequency $f_c$ of the open loop transfer characteristic $G_{open}$ indicated by a solid line in FIG. 3. As a result, the control system shown in FIG. 5 has a disturbance suppressing characteristic indicated by a chain line in FIG. 2, which makes clear that the disturbances are well suppressed particularly in a low band. For example, an improvement of the disturbance suppressing characteristic by about 20 dB can be observed at a frequency of 2 Hz.

Here, as being clear from FIG. 3, since $G_F(s)$ and $G_{open}$ satisfy the above condition (i) for the full range of frequencies, the disturbance suppressing characteristic indicated by the chain line in FIG. 2 is generally in accordance with the above-described open loop characteristic expressed by the equation (17). The aim of the present invention is to this point.

Figure 1:
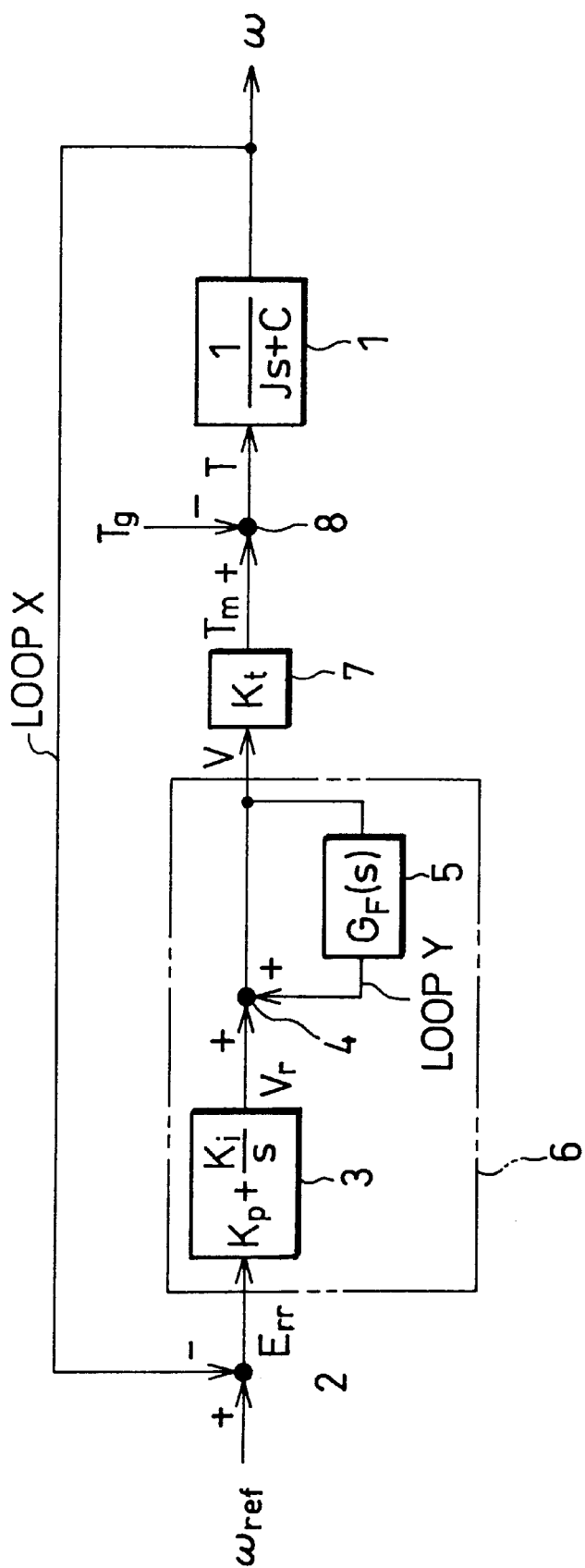
FIG. 1 is a block diagram illustrating an arrangement of a motor control device of the present invention.

The following description will discuss an embodiment of the present invention. FIG. 1 is an example of an arrangement of a motor control device of the present invention. The motor control device is realized by adding a loop for positive feedback of a driving voltage through a filter to the conventional feedback control system shown in FIG. 6.

As illustrated in FIG. 1, a characteristic of a motor 1 is represented as a transfer function of $1/(Js+C)$, where J represents a moment of inertia of the motor 1, C represents a coefficient of viscosity which is determined with an influence of a back electromotive force on the motor 1 taken into consideration, and s represents the Laplace operator.

An output ω of the motor control device is a velocity signal indicating a rotating speed of the motor 1, which is detected by a velocity detector (not shown). Note that since it is premised that a velocity signal indicating an accurate rotating speed of the motor 1 can be detected by the velocity detector, a transfer element corresponding to the velocity detector is omitted from FIG. 1.

A comparator 2 is provided on an input side of the motor control device. The velocity signal ω is sent to the comparator 2 through the negative feedback loop X, while a velocity reference value $\omega_{ref}$ as a reference speed of the motor 1 is also supplied thereto. Therefore, the comparator 2 outputs an error signal Err as a difference between the velocity reference value $\omega_{ref}$ and the velocity signal ω. By this feedback control, the velocity signal 0 is controlled so as to coincide with the velocity reference value $\omega_{ref}$.

A driving circuit 3 is connected to an output terminal of the comparator 2 so that the error signal $E_{rr}$ is supplied to the driving circuit 3. The driving circuit 3 conducts a control operation which is a combination of proportional compensation and integral compensation, and outputs a driving voltage $V_r$. Note that the proportional compensation relates to speed control whereas the integral compensation relates to phase control. A characteristic of the driving circuit 3 is represented as a transfer function of $K_p + K_i/s$, where $K_p$ represents a proportional gain whereas $K_i$ represents an integral gain.

An adder 4 is provided so as to connected to an output terminal of the driving circuit 3. A motor driving voltage V outputted by the adder 4 is fed back to the adder 4 through a positive feedback loop Y having a filter 5, so as to be added to a driving voltage $V_r$. Note that the driving circuit 3, the adder 4, and the positive feedback loop Y including the filter 5 constitute a driving unit 6.

The motor driving voltage V thus generated is supplied to a block 7, so as to be converted into a driving torque $T_m$. A characteristic of the block 7 is represented as a coefficient $K_t$, and the coefficient $K_t$ is called as torque constant of the motor 1. Note that the torque constant is a constant found by calculating (driving torque)/(driving voltage).

In addition, a disturbance torque $T_g$ is applied to the motor 1, and equivalently a subtracter 8 is connected to an output terminal of the block 7 so that the driving torque $T_m$ and the disturbance torque $T_g$ applied to the motor 1 are supplied to the subtracter 8. Note that the subtracter 8 is shown in the figure for convenience sake so as to indicate that the disturbance torque $T_g$ is applied to the motor 1, and such a circuit as the subtracter 8 does not actually exist in the arrangement. The subtracter 8 subtracts the disturbance torque $T_g$ from the driving torque $T_m$, and sends a net driving torque T thus obtained to the motor 1. The motor 1 rotates in accordance with the net driving torque T, and sequentially the velocity signal ω is detected.

An open loop transfer function $G_{open2}$ of this control system is given as:

$$G_{open2} = (K_p + K_i/s) \cdot \{1/(1 - G_F(s))\} \cdot K_t \cdot \{1/(J \cdot s + C)\} \quad (19)$$
$$= G_{open}/(1 - G_F(s))$$

Using the equation (19), a response $G_{comp2}$ of the velocity signal ω to the disturbance torque $T_g$ is given as:

$$G_{comp2} = \{1/(J \cdot s + C)\}/(1 + G_{open2}) \quad (20)$$
$$= \{1/(J \cdot s + C)\}/\{1 + G_{open}/(1 - G_F(s))\}$$
$$= (1 - G_F(s)) \cdot [\{1/(J \cdot s + C)\}/\{1 + G_{open} - G_F(s)\}]$$

Here, the filter 5 ($G_F(s)$) is arranged so as to satisfy the following condition for the full range of frequencies:

$$|G_F(s)| < |G_{open}| \quad (21)$$

As a result, by comparing the equation (19) and the equation (13) and comparing the equation (20) and the equation (14), the following relational expressions can be obtained:

$$G_{open2} \approx G_{open1} \quad (22)$$
$$G_{comp2} \approx G_{comp1} \quad (23)$$

These relations are well established particularly in the low band where the condition of $|G_F(s)| \ll |G_{open}|$ is sufficiently satisfied, as being clear from FIG. 3. Therefore, the control system shown in FIG. 1 is capable of obtaining a disturbance suppressing effect substantially on a level with that of the conventional motor control device (see FIG. 7) using the disturbance observer for the full range of frequencies.

Note that, as described based on the equations (15) and (16), it is necessary that $G_F(s)$ is set to approximately 1 in a specific frequency band in which the disturbances should be suppressed, regarding the equation (20) as well. It is understood that $G_F(s)$ does not actually equal 1 because, based on equation (19), $G_{open}$ would be divisible by zero, which is impossible.

The following description will discuss the disturbance suppressing characteristic of the control system shown in FIG. 1. A solid line in FIG. 2 indicates the disturbance suppressing characteristic $G_{comp2}$ of the present embodiment (see FIG. 1). Note that the chain line in the figure indicates the disturbance suppressing characteristic $G_{comp1}$ of the control system (see FIG. 4) using the disturbance observer, while the broken line indicates the disturbance suppressing characteristic $G_{comp}$ of the usual feedback control system (see FIG. 6). These three disturbance suppressing characteristics were obtained from three devices, respectively, with members used in common in the devices being arranged so as to have the same functions.

The filter 5 is a first-order low-pass filter whose transfer function $G_F(s)$ has a characteristic shown in FIG. 3. Specifically, the cut-off frequency $f_L$ of the filter 5 is set to not higher than the gain crossover frequency $f_c$ of the open loop transfer characteristic $G_{open}$ of the feedback control system shown in FIG. 3.

It can be seen from FIG. 2 that the disturbance suppressing characteristic $G_{comp2}$ of the present embodiment and the disturbance suppressing characteristic $G_{comp1}$ of the control system using the disturbance observer exhibit substantially the same disturbance suppressing effects, which are both superior to the disturbance suppressing characteristic $G_{comp}$ of the usual feedback control system. Besides, the control system of the present embodiment has only the loop X as a negative feedback loop for feeding back the velocity signal a, the loop X practically and equivalently feeding back the velocity signal ω directly to the comparator 2 to which the velocity reference value $\omega_{ref}$ is supplied. In other words, the present embodiment has a very simple arrangement, which is obtained by completely omitting the loop C from the block diagram of FIG. 5 equivalently illustrating the control system which has the disturbance observer. Nevertheless, the control system of the present embodiment exhibits a disturbance suppressing effect in the low band on a level with that of the control system using the disturbance observer.

Note that in the present embodiment the low-pass filter is used as the filter 5 for suppressing the influence of the disturbances in the low band, but this is not a sole definite arrangement according to the principle concept of the present invention. Any filter can be utilized provided that a purpose is met. For example, for suppressing a disturbance having a specific frequency component, such as a torque ripple, a band-pass filter which passes a signal in a band which contains the specific frequency may be used.

Though the above description discussed the arrangement having a filter which for the full range of frequencies satisfies the condition expressed by the equation (21), it is not necessarily requisite that the condition of the equation (21) is satisfied, regarding a band of frequencies not lower than the above-mentioned gain crossover frequency fc of the open loop transfer characteristic $G_{open}$.

For example, by using the equations (2), (14), and (20), the following relation can be set up:

$$G_{comp2} \approx G_{comp1} \approx G_{comp}$$

under the following condition:
$$|G_{open}| < |G_F(s)| \ll 1 \quad (24)$$

To be more specific, substantially the same disturbance suppressing effect as that obtained with the arrangement using the disturbance observer can be also obtained with the arrangement shown by the block diagram of FIG. 1, in the case where the characteristic of the filter 5 is set (1) so as to satisfy $|G_F(s)| < 1$ in the band of frequencies not lower than the above-mentioned gain crossover frequency $f_c$ of the open loop transfer characteristic $G_{open}$, while (2) so as to satisfy $G_F(s) \approx 1$ in the band of frequencies lower than the gain crossover frequency, in which the disturbances should be suppressed.

As has been described above, with the arrangement of the present embodiment, a desirable disturbance suppressing characteristic, which is on a level with that in the case where the disturbance observer is utilized, can be obtained without estimating the disturbance torque. Moreover, the arrangement of the present embodiment is very simple, with the positive feedback loop for feeding back the driving voltage through the filter being added to the usual feedback control system. Besides, the loop for negatively feeding back the velocity signal indicating the rotating speed of the motor to the previous stage of the driving means is composed of only a loop for practically and equivalently feeding back the velocity signal directly to the previous stage of the driving means.

Furthermore, since the nominal value of the motor characteristic is not used in the present embodiment, the disturbance suppressing characteristic does not deteriorate even though the characteristic of the motor is irregular.

As has been so far described, the motor control device of the present invention is provided by adding a positive feedback loop to a usual feedback control system, the positive feedback loop being for feeding back a driving voltage through a filter having a predetermined characteristic. The filter has a transfer function $G_F(s)$ as the predetermined characteristic, which becomes approximately 1 in a frequency band in which the disturbances should be suppressed.

Being thus arranged, the motor control device, in spite of its simple arrangement, is capable of suppressing the disturbances well, irrelevant to characteristics of the motor. Furthermore, there is no need to estimate the disturbance torque in the case where a positive feedback loop having a filter is added to the usual feedback control system, the filter satisfying $G_F(s) \approx 1$ in a frequency band in which the disturbances should be suppressed, and also satisfying:

(A) $|G_{open}| > |G_F(s)|$, for a full range of frequencies; and (B) $|G_F(s)| < 1$, in a specific frequency band in which $|G_{open}| < |G_F(s)|$ is satisfied, where $G_{open}$ represents an open loop transfer function of the usual feedback control system. As a result, the motor control device of the present invention, in spite of having a very simple arrangement, is capable of obtaining a good disturbance suppressing characteristic, irrelevant to motor characteristics which may vary, the disturbance suppressing characteristic being on a level with that of the conventional motor control device having the disturbance observer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor control device for controlling a motor, comprising:

error detecting means for outputting an error signal indicating a difference between a rotating speed of the motor and a reference rotating speed; and driving means for generating and outputting a motor driving voltage in accordance with the error signal, said driving means including a positive feedback loop for feeding back the motor driving voltage through a filter, wherein:

the filter has a transfer function given as $G_F(s)$ which is set so as to become approximately 1 but not equal to 1 in a predetermined frequency band.

2. The motor control device as set forth in claim 1, wherein the filter satisfies for a full range of frequencies:

$$|G_F(s)| < |G_{open}|$$

where $G_{open}$ represents an open loop transfer function of a control system including the motor, the error detecting means and the driving means when the filter is disconnected.

3. The motor control device as set forth in claim 1, wherein the filter satisfies $|G_F(s)| < 1$ in a frequency band in which $|G_F(s)| < |G_{open}|$ is satisfied, where $G_{open}$ represents an open loop transfer function of a control system including the motor, the error detecting means and the driving means when the filter is disconnected.

4. The motor control device as set forth in claim 1, wherein the filter satisfies $|G_F(s)| < |G_{open}|$ in a band of frequencies not lower than a gain crossover frequency of an open loop transfer function $G_{open}$ of a control system including the motor, the erroe detecting means and the driving means when the filter is disconnected, and the filter satisfies $|G_F(s)| < 1$ in a band of frequencies not lower than the gain crossover frequency.

5. The motor control device as set forth in claim 1, wherein the filter is a low-pass filter.

6. The motor control device as set forth in claim 2, wherein the filter is a low-pass filter.

7. The motor control device as set forth in claim 3, wherein the filter is a low-pass filter.

8. The motor control device as set forth in claim 1, wherein the filter is a band-pass filter.

9. The motor control device as set forth in claim 2, wherein the filter is a band-pass filter.

10. The motor control device as set forth in claim 3, wherein the filter is a band-pass filter.

11. The motor control device as set forth in claim 1, wherein the driving means is separate from the motor.

12. The motor control device as set forth in claim 1, further comprising a negative feedback loop that inputs a signal representing the rotating speed of the motor to the error detecting means, wherein a control system including the positive feedback loop within the negative feedback loop operates in accordance with the error signal.

13. A motor control device for controlling a motor, comprising:

a comparator that outputs an error signal indicating the difference between a rotating speed of the motor and a reference rotating speed; and a driving unit that generates and outputs a motor driving voltage in accordance with the error signal, the driving unit including a positive feedback loop that feeds back the motor driving voltage through a filter, wherein:

the filter has a transfer function given as $G_F(s)$ which is set so as to become approximately one but not equal to one in a predetermined frequency band.

14. The motor control device as claim 13, wherein the filter satisfies for a full range of frequencies:

$$|G_F(s)| < |G_{open}|$$

where $G_{open}$ represents an open loop transfer function of a control system including the motor, the comparator and the driving unit when the filter is disconnected.

15. The motor control device as set forth in claim 13, wherein the filter satisfies $|G_F(s)| < 1$ in a frequency band in which $|G_F(s)| > |G_{open}|$ is satisfied, where $G_{open}$ represents an open loop transfer function of a control system including the motor, the comparator and the driving unit when the filter is disconnected.

16. The motor control device as set forth in claim 13, wherein the filter satisfies $|G_F(s)| < |G_{open}|$ in a band of frequencies lower than a gain crossover frequency of an open loop transfer function $G_{open}$ of a control system including the motor, the comparator and the driving unit when the filter is disconnected and the filter satisfies $|G_F(s)| < 1$ in a band of frequencies lower than the gain crossover frequency.

17. The motor control device as set forth in claim 13, wherein the driving unit is separate from the motor.

18. The motor control device as set forth in claim 13, further comprising a negative feedback loop that inputs a signal representing the rotating speed of the motor to the comparator, wherein a control system including the positive feedback loop within the negative feedback loop operates in accordance with the error signal.

19. A method for controlling a motor, comprising the steps of:

(a) outputting an error signal indicating a difference between a rotating speed of the motor and a reference rotating speed; and generating and outputting a motor driving voltage in accordance with the error signal, including a positive feedback loop for feeding back the motor driving voltage through a filter, wherein the filter has a transfer function given as $G_F(s)$ which is set so as to become but not equal to one in a predetermined frequency band.

20. The motor control device as set forth in claim 13, wherein the driving voltage is used in a controlling operation of a negative feedback loop that inputs a signal representing the rotating speed to the comparator.

21. A motor control device for controlling a motor, comprising a negative feedback loop including:
   error detecting means for outputting an error signal indicating a difference between a rotating speed of said motor and a reference rotating speed; and
   driving means for generating and outputting a motor driving voltage in accordance with the error signal, wherein
   in said driving means, a positive feedback loop is provided, which is formed with a filter having a transfer function given as $G_F(s)$ which is set so as to be approximately 1 but not equal to 1 in a predetermined frequency band, and an adder which adds an output signal outputted from itself through said filter to an input signal inputted to itself.

22. The motor control device as set forth in claim 21, wherein the filter satisfies for a full range of frequencies:

$$|G_F(s)|<|G_{open}|$$

where $G_{open}$ represents an open loop transfer function of a control system including the motor, the error detecting means and the driving means when the filter is disconnected.

23. The motor control device as set forth in claim 21, wherein the filter satisfies $|G_F(s)|<1$ in a frequency band in which $|G_F(s)|>|G_{open}|$ is satisfied, where $G_{open}$ represents an open loop transfer function of a control system including the motor, the error detecting means and the driving means when the filter is disconnected.

24. The motor control device as set forth in claim 21, wherein the filter satisfies $|G_F(s)|<|G_{open}|$ in the band of frequencies lower than the gain crossover frequency of an open loop transfer function $G_{open}$ of a control system including the motor, the error detecting means and the driving means when the filter is disconnected, and the filter satisfies $|G_F(s)|<1$ in a band of frequencies not lower than the gain crossover frequency.

25. The motor control device as set forth in claim 21, wherein the filter is a low-pass filter.

26. The motor control device as set forth in claim 22, wherein the filter is a low-pass filter.

27. The motor control device as set forth in claim 23, wherein the filter is a low-pass filter.

28. The motor control device as set forth in claim 21, wherein the filter is a band-pass filter.

29. The motor control device as set forth in claim 22, wherein the filter is a band-pass filter.

30. The motor control device as set forth in claim 23, wherein the filter is a band-pass filter.

31. A motor control device as set forth in claim 5, wherein a cut-off frequency of said low-pass filter is not greater than a gain crossover frequency of an open loop transfer function of a control system including the motor, the error detecting means, and the driving means without the filter.

32. A motor control device as set forth in claim 25, wherein a cut-off frequency of said low-pass filter is not greater than a gain crossover frequency of an open loop transfer function of a control system including the motor, the error detecting means, and the driving means without the filter.

33. The motor control device as set forth in claim 1, wherein the positive feedback loop is included within a negative feedback loop including the motor, the error detecting means, and the driving means.

34. The motor control device as set forth in claim 13, wherein the positive feedback loop is included within a negative feedback loop including the motor, the error detecting means, and the driving means.

* * * * *